(12) United States Patent
Kagaya et al.

(10) Patent No.: US 8,467,118 B2
(45) Date of Patent: Jun. 18, 2013

(54) OPTICAL MODULE

(75) Inventors: Osamu Kagaya, Tokyo (JP); Hirofumi Nakagawa, Samukawa (JP); Taichi Kogure, Kamakura (JP)

(73) Assignee: Oclaro Japan, Inc., Kanagawa (JP)

( * ) Notice: Subject to any disclaimer, the term of this patent is extended or adjusted under 35 U.S.C. 154(b) by 155 days.

(21) Appl. No.: 13/015,769

(22) Filed: Jan. 28, 2011

(65) Prior Publication Data

US 2011/0188108 A1 Aug. 4, 2011

(30) Foreign Application Priority Data

Jan. 29, 2010 (JP) .................................. 2010-019362

(51) Int. Cl.
*G02B 26/00* (2006.01)
*G02B 6/12* (2006.01)
*G02B 6/36* (2006.01)

(52) U.S. Cl.
USPC .............................. 359/237; 385/14; 385/88

(58) Field of Classification Search
USPC .......... 359/245, 237, 254, 240, 248; 398/117, 398/135, 139, 182, 200, 183; 385/14, 76, 385/88, 92; 324/95
See application file for complete search history.

(56) References Cited

U.S. PATENT DOCUMENTS

2007/0065161 A1  3/2007  Miura et al.
2010/0124423 A1  5/2010  Kagaya et al.

FOREIGN PATENT DOCUMENTS

JP  2007-82094   3/2007
JP  2010-123640  6/2010

*Primary Examiner* — Tuyen Tra
(74) *Attorney, Agent, or Firm* — Antonelli, Terry, Stout & Kraus, LLP.

(57) ABSTRACT

To achieve a size-reduction of an optical module having a circuit that generates a high-frequency clock signal for controlling optical modulation by an optical modulator and to suppress radiation of electromagnetic waves from the optical module. A through-hole via is formed on a multilayer printed circuit board so as to be insulated from a plurality of grounded wiring layers by an anti-pad. A coaxial connector and an intensity modulation control IC that generates a high-frequency clock signal are provided on the multilayer printed circuit board. The high-frequency clock signal is input to the coaxial connector through a micro-strip line formed on the multilayer printed circuit board. An open stub connected to the through-hole via is provided on a wiring layer between a first wiring layer and a second wiring layer among the plurality of wiring layers.

4 Claims, 9 Drawing Sheets

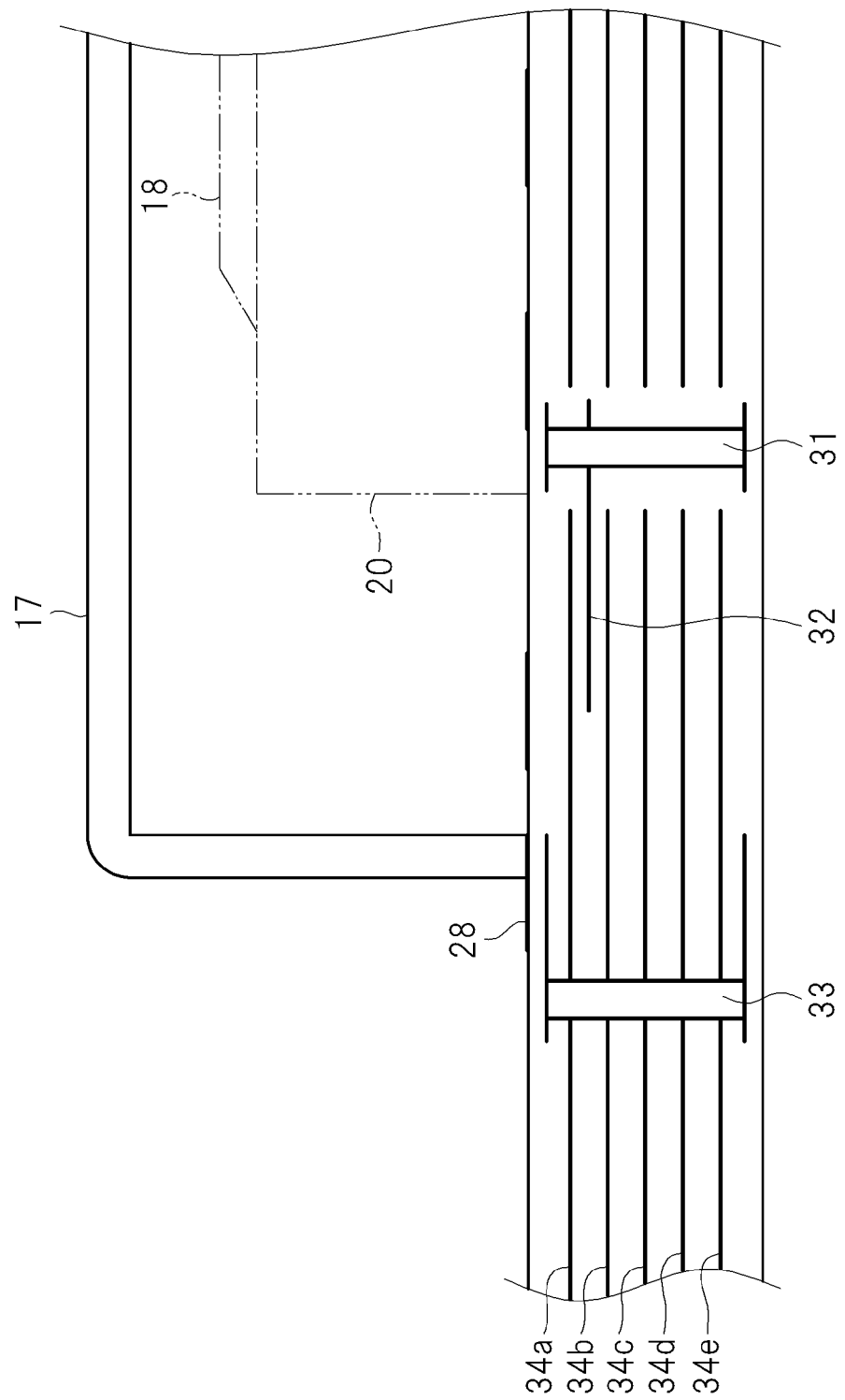

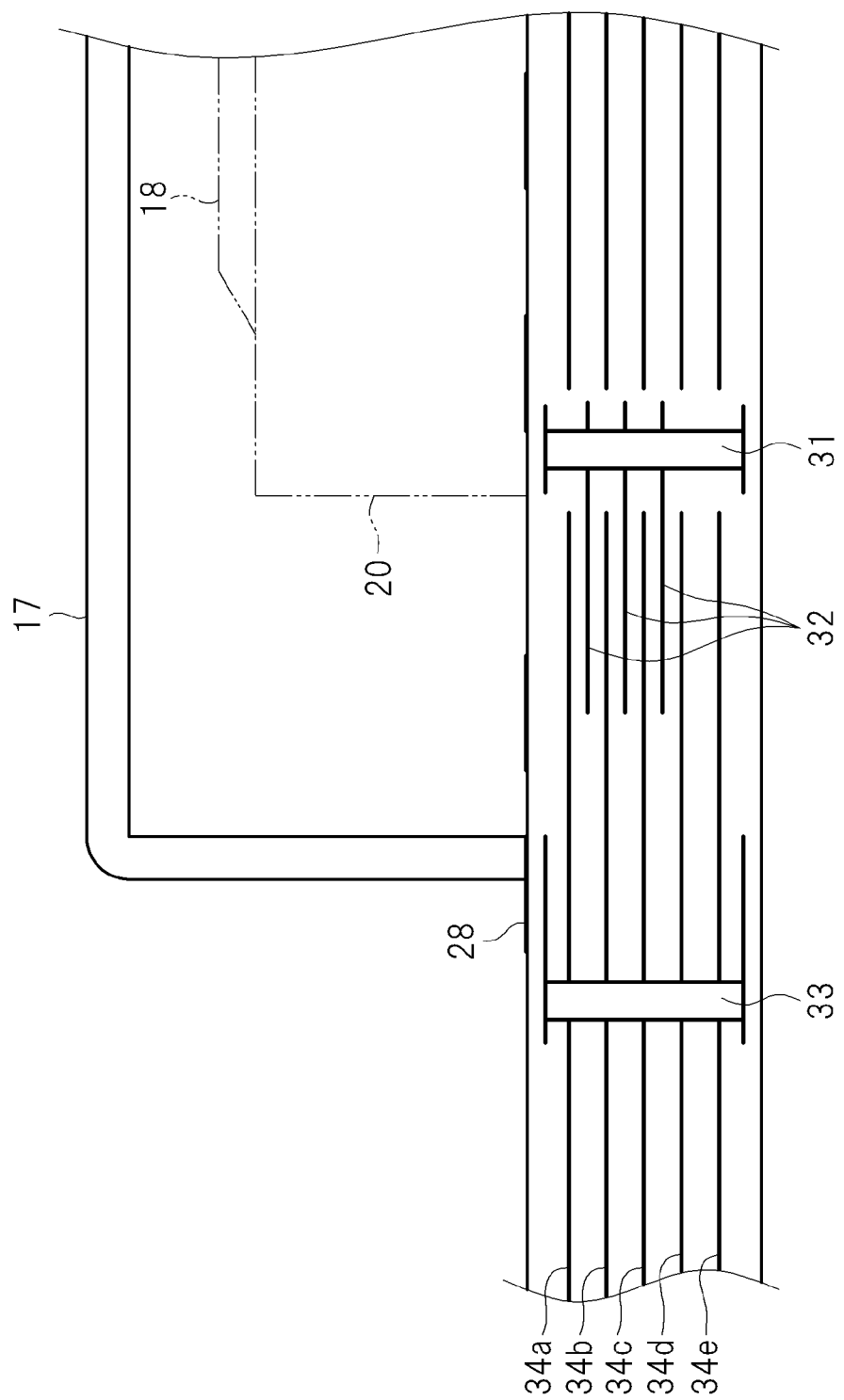

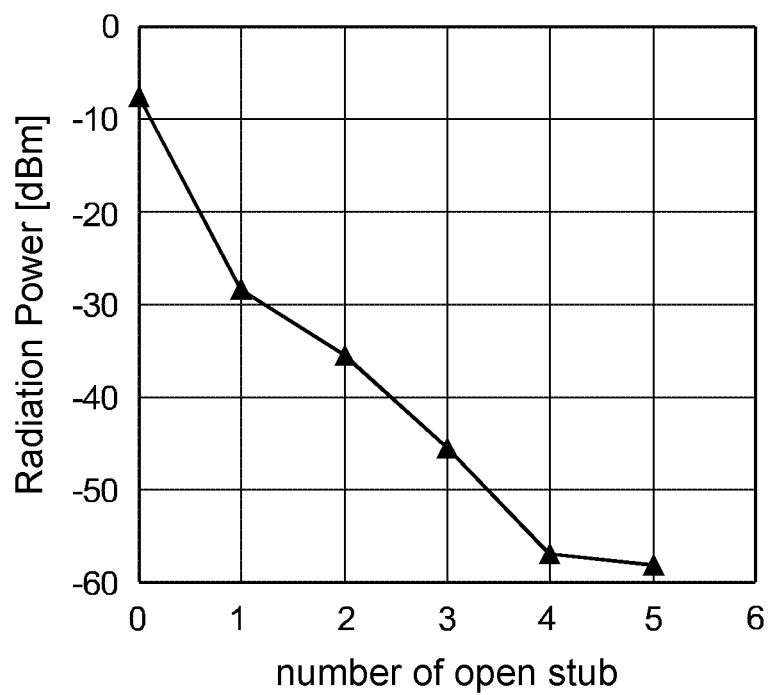

OPTICAL MODULE

CROSS-REFERENCE TO RELATED APPLICATION

The present application claims priority from Japanese application JP 2010-019362 filed on Jan. 29, 2010, the content of which is hereby incorporated by reference into this application.

BACKGROUND OF THE INVENTION

1. Field of the Invention

The present invention relates to an optical module.

2. Description of the Related Art

An optical module such as an optical transceiver which includes a circuit that generates a high-frequency clock signal for controlling optical modulation (for example, so-called RZ (Return to Zero) modulation) by an optical modulator (for example, an LN modulator) is known. JP2007-82094A discloses an optical transmission device having such a circuit.

SUMMARY OF THE INVENTION

A case where a high-frequency clock signal generated by the circuit described above is supplied to an optical modulator through a coaxial cable will be considered. In this case, in order to decrease the size of an optical module, the above-described circuit and a coaxial connector may be provided on a printed circuit board, and the output terminal of the circuit and the coaxial connector may be connected by a signal line (for example, a micro-strip line). In this case, the coaxial connector is connected to the optical modulator by the coaxial cable.

Since electromagnetic waves are radiated from a connection portion between the signal line and the coaxial connector and the signal line itself, in order to suppress radiation of the electromagnetic waves from the optical module, the printed circuit board may be covered with a metal cover, for example.

However, in order to supply an external driving power to the circuit and the like covered with the metal cover, it is necessary to open a hole in the printed circuit board. Therefore, when the frequency of the high-frequency clock signal is high, electromagnetic waves can be easily radiated from the hole. As a result, there is a problem in that radiation of the electromagnetic waves from the optical module is not suppressed as expected.

An object of the present invention is to achieve a size-reduction of an optical module having a circuit that generates a high-frequency clock signal for controlling optical modulation by an optical modulator and to suppress radiation of electromagnetic waves from the optical module.

In order to solve the above-described problems, an optical module according to the present invention includes a multilayer printed circuit board which includes a plurality of ground conductor layers and in which a via-hole is formed so as to be insulated from a first ground conductor layer and a second ground conductor layer among the plurality of ground conductor layers by an anti-pad; and an amplification circuit that generates an output signal for controlling optical modulation by an optical modulator and outputs the output signal to the optical modulator. An open stub is connected in the midway of the via-hole, and the open stub is provided on a layer between the first ground conductor layer and the second ground conductor layer. The length of the open stub has a value corresponding to n/4 (n is an odd number) of a wavelength which is determined based on the frequency having the maximum intensity of the frequency components of the output signal.

In order to solve the above-described problems, an optical module according to the present invention includes a multilayer printed circuit board which includes a plurality of ground conductor layers and in which a via-hole is formed so as to be insulated from a first ground conductor layer and a second ground conductor layer among the plurality of ground conductor layers by an anti-pad; a coaxial connector that is provided on the multilayer printed circuit board; a modulation control circuit that generates a high-frequency clock signal for controlling optical modulation by an optical modulator and outputs the high-frequency clock signal to the coaxial connector; a signal line which is formed on the multilayer printed circuit board and which is connected to the coaxial connector and the modulation control circuit provided on the multilayer printed circuit board; and a metal casing which is provided so as to cover an upper portion of the modulation control circuit. An open stub is provided in the midway of the via-hole. The open stub is provided on a layer between the first ground conductor layer and the second ground conductor layer. The open stub is disposed in a lower region of the metal casing.

According to an embodiment of the present invention, the open stub may have a length that corresponds to the frequency of the high-frequency clock signal. For example, the length of the open stub may have a value corresponding to n/4 (n is an odd number) of the wavelength corresponding to the high-frequency clock signal which is determined based on the frequency.

BRIEF DESCRIPTION OF THE DRAWINGS

FIG. 7 shows a sectional view of the intensity modulation controller.

FIG. 8 shows a sectional view of the intensity modulation controller.

FIG. 9 is a line graph showing the calculation results of radiation power.

DETAILED DESCRIPTION OF THE INVENTION

Hereinafter, an embodiment of the present invention will be described with reference to the drawings.

[Optical Transceiver]

Figure 1:
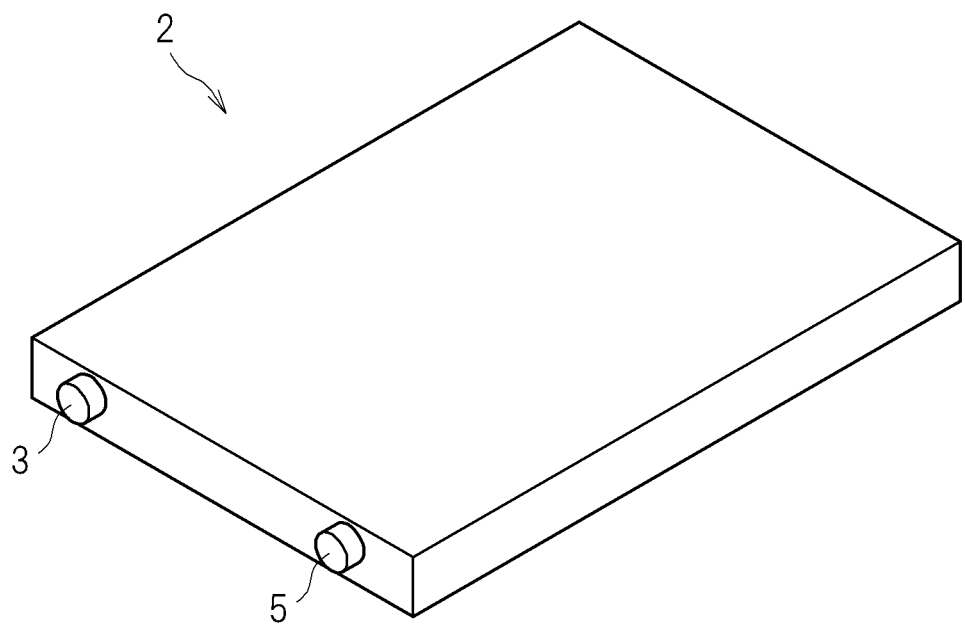
FIG. 1 shows an external appearance of an optical transceiver according to an embodiment of the present invention.

FIG. 1 shows an external appearance of an optical transceiver 2 which is an optical module according to an embodiment of the present invention. As shown in FIG. 1, the optical transceiver 2 includes two bushes 3 and 5, and an optical fiber (not shown) is connected to each bush. In the present embodiment, an optical signal is received through the bush 3, and an optical signal is transmitted through the bush 5. The bushes 3 and 5 are formed of conductive rubber, for example.

Figure 2:
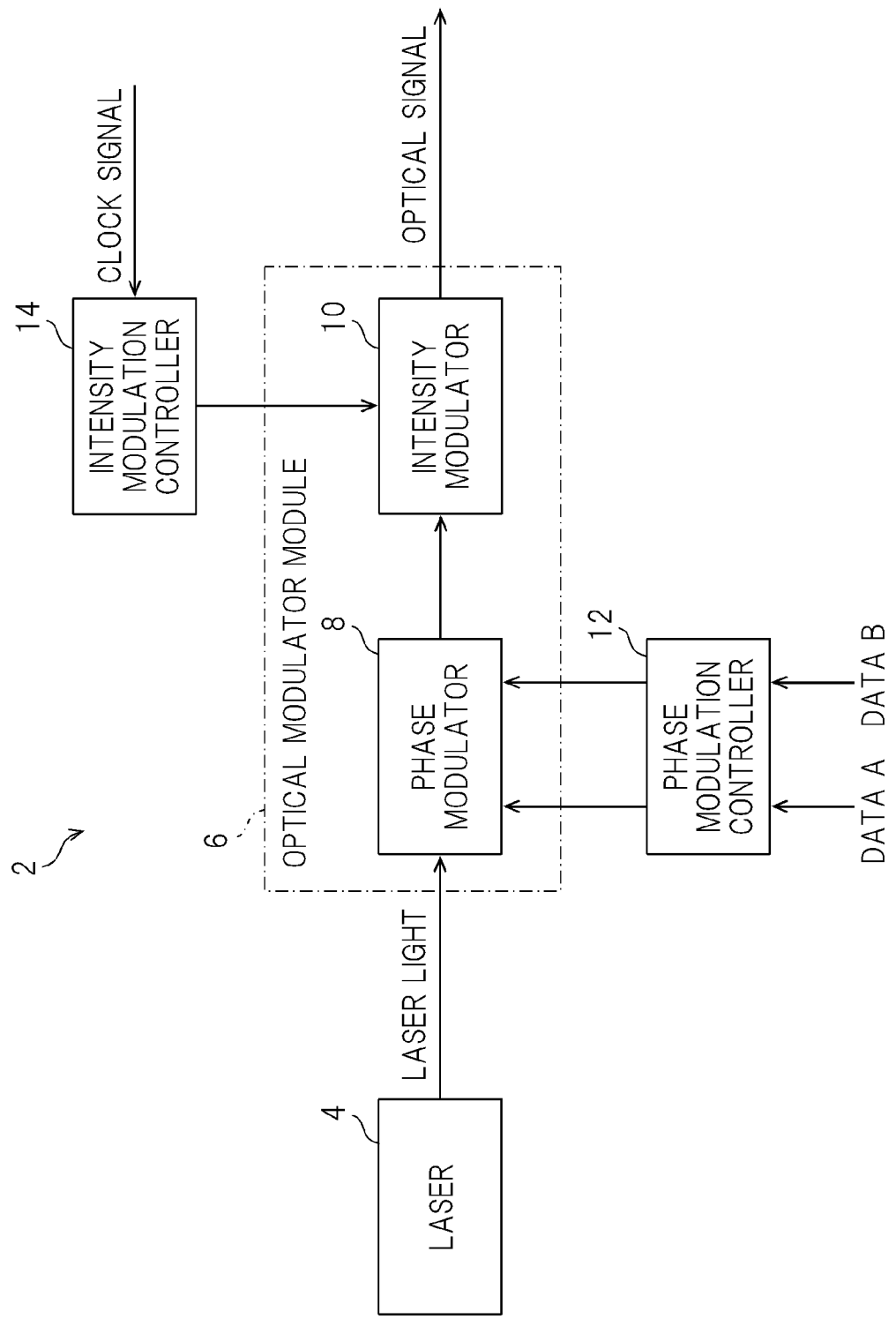
FIG. 2 shows the configuration of the optical transceiver.

FIG. 2 shows the configuration of the optical transceiver 2. The optical transceiver 2 includes a device which forms a transmission module used for transmitting an optical signal and a device which forms a reception module used for receiving an optical signal. FIG. 2 shows a device which forms a transmission module.

As shown in FIG. 2, the optical transceiver 2 includes a laser 4, an optical modulator module 6, which includes a phase modulator 8 and an intensity modulator 10, a phase modulation controller 12, an intensity modulation controller 14, and the like. In the present embodiment, the optical transceiver 2 including the intensity modulation controller 14 corresponds to the "optical module."

The laser 4 outputs a laser light. The laser light output from the laser 4 is modulated by the optical modulator module 6 and output as an optical signal.

[Optical Modulator Module]

In the optical transceiver 2, phase modulation and intensity modulation is performed by the optical modulator module 6. For example, when the optical transceiver 2 is an optical transceiver using a RZ-DQPSK (Return to Zero Differential Quadrature Phase Shift Keying) method operating at a bit-rate of 43 Gbps, RZ-DQPSK modulation is performed.

Specifically, the phase modulator 8 performs phase modulation in accordance with a phase modulation control signal supplied from the phase modulation controller 12. Moreover, the intensity modulator 10 (optical modulator) which is an intensity modulator such as a Mach-Zehnder-type lithium niobate optical modulator (a so-called LN modulator) or a semiconductor optical modulator performs intensity modulation (for example, RZ modulation) in accordance with an intensity modulation control signal which is a high-frequency clock signal supplied from the intensity modulation controller 14. That is, the intensity modulator 10 performs intensity modulation at the clock frequency of the intensity modulation control signal. Here, the clock frequency is the frequency having the maximum intensity of the frequency components included in the intensity modulation control signal. The intensity modulation control signal is a sinusoidal signal and has a voltage amplitude of 4 Vpp or higher. The intensity modulation control signal may be a rectangular signal and a triangular signal.

Here, the intensity modulator 10 and the intensity modulation controller 14 are connected by a coaxial cable, and the intensity modulation control signal is supplied from the intensity modulation controller 14 to the intensity modulator 10 through the coaxial cable. Moreover, the clock frequency of the intensity modulation control signal is 21.5 GHz, for example, when the optical transceiver 2 is an optical transceiver using the RZ-DQPSK method operating at a bit-rate of 43 Gbps.

The phase modulation control signal is generated based on two-channel data signals (data A and B in FIG. 2). Moreover, the intensity modulation control signal is generated based on a high-frequency clock signal (see FIG. 2) generated by a multiplexer IC (not shown). More specifically, the clock signal is amplified by the intensity modulation controller 14, and the amplified clock signal is supplied to the intensity modulator 10 as the intensity modulation control signal.

[Intensity Modulation Controller]

Next, the intensity modulation controller 14 which is an optical module according to the embodiment of the present invention will be described.

Figure 3:
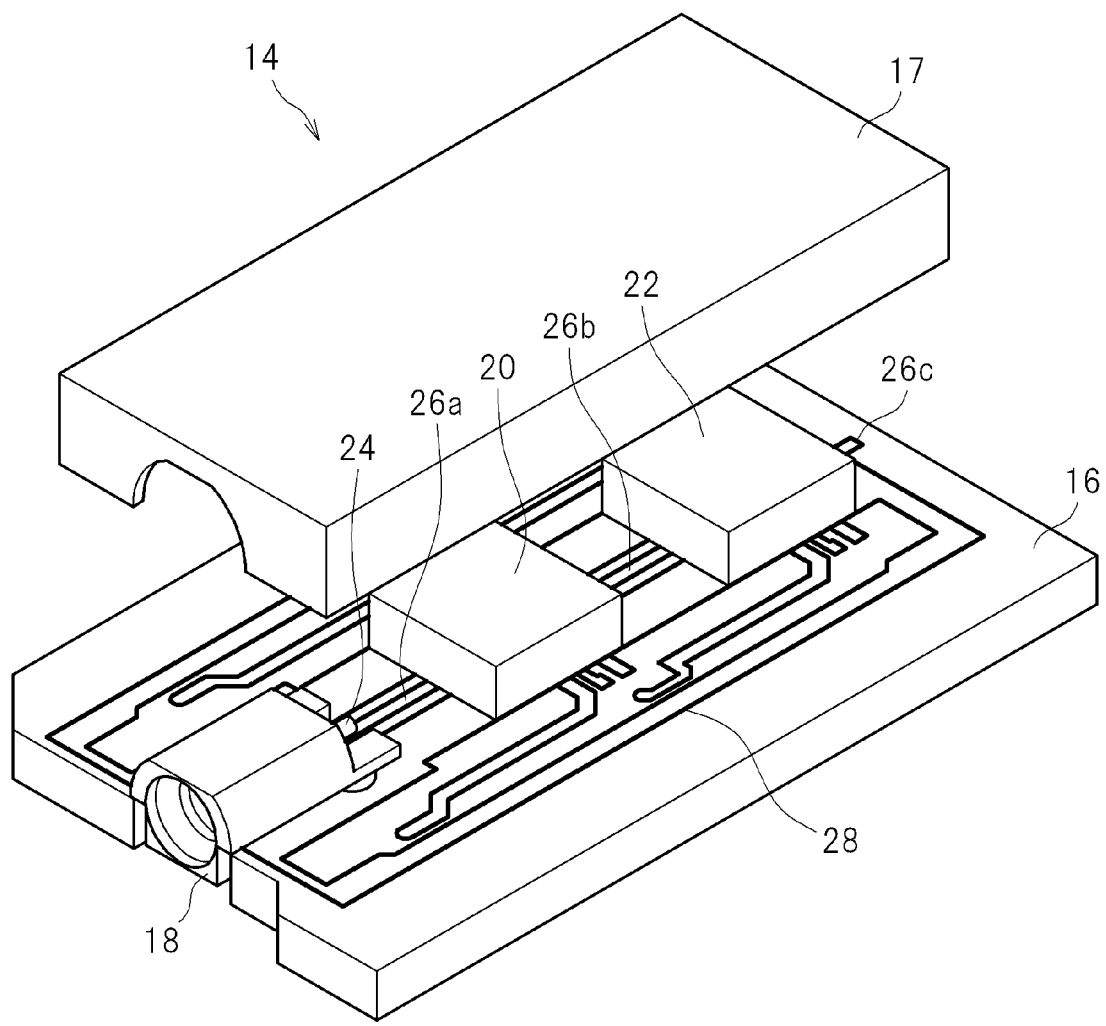
FIG. 3 shows the configuration of an intensity modulation controller.

FIG. 3 shows the configuration of the intensity modulation controller 14. As shown in FIG. 3, the intensity modulation controller 14 includes a multilayer printed circuit board 16, a metal casing 17, a coaxial connector 18, an intensity modulation control IC 20 (modulation control circuit), an amplifier IC 22, and the like. The metal casing 17, the coaxial connector 18, the intensity modulation control IC 20, and the amplifier IC 22 are disposed on the multilayer printed circuit board 16. The coaxial connector 18 is disposed on the multilayer printed circuit board 16 by an edge mounting method. In this example, the metal casing 17 is disposed so as to correspond to the position of a surface copper foil pattern 28 formed on the multilayer printed circuit board 16. As a result, the coaxial connector 18, the intensity modulation control IC 20, and the amplifier IC 22 are covered by the metal casing 17. The surface copper foil pattern 28 is connected to a grounded wiring layer disposed in the inner side of the multilayer printed circuit board 16.

The importance of the metal casing 17 will be described later.

An output terminal of the intensity modulation control IC and a core conductor 24 of the coaxial connector 18 are connected by a micro-strip line 26a (signal line) formed on the multilayer printed circuit board 16. Moreover, an input terminal of the intensity modulation control IC 20 and an output terminal of the amplifier IC 22 are connected by a micro-strip line 26b formed on the multilayer printed circuit board 16. Moreover, an input terminal of the amplifier IC 22 is connected to a micro-strip line 26c formed on the multilayer printed circuit board 16. A grounded coplanar waveguide may be used in place of the micro-strip lines 26a, 26b, and 26c.

The above-described clock signal is input to the amplifier IC 22 through the micro-strip line 26c. Based on this clock signal, the intensity modulation control IC 20 generates the intensity modulation control signal and outputs the intensity modulation control signal to the coaxial connector 18 through the micro-strip line 26a. That is, the above-described clock signal is amplified by the amplifier IC 22 and the intensity modulation control IC 20 and output to the coaxial connector 18 as the intensity modulation control signal. The intensity modulation control signal is supplied to the intensity modulator 10 through a coaxial cable (not shown) that is connected to the coaxial connector 18. Since the amplifier IC 22 compensates for the gain of the intensity modulation control IC 20, the amplifier IC 22 may be omitted if the gain of the intensity modulation control IC 20 is high.

The core conductor 24 and the intensity modulation control IC 20 can be connected using a coaxial line such as a coaxial cable in place of the micro-strip line 26a. However, in this case, it is difficult to reduce the size of the intensity modulation controller 14.

In this regard, a size-reduction of the intensity modulation controller 14 is realized by connecting the core conductor 24 and the intensity modulation control IC 20 using a micro-strip line. Moreover, by realizing the size-reduction of the intensity modulation controller 14, the size-reduction of the transmission module and optical transceiver 2 described above can be realized.

[Multilayer Printed Circuit Board]

Next, details of the multilayer printed circuit board 16 will be described. The multilayer printed circuit board 16 is a multilayer board which includes a plurality of copper foil patterns which are wiring layers. The material of a dielectric substance between the respective wiring layers is FR4 (Flame Retardant Type 4), for example. The wiring layers are also referred to as wiring films.

A plurality of via-holes 31 for achieving interlayer connection such as through-hole vias or interstitial via-holes (IVH) is formed on the multilayer printed circuit board 16 (see FIG. 4 described later). In the present embodiment, although approximately circular via-holes 31 are formed, the shape of the via-holes 31 is not limited to an approximately circular shape. The via-holes 31 enable connecting an external IC or the like of the intensity modulation controller 14 to an internal IC or the like of the intensity modulation controller 14. For example, the via-holes 31 enable connecting a power supply provided outside the intensity modulation controller 14 to the intensity modulation control IC 20. As a result, a driving power output from the power supply can be supplied to the intensity modulation control IC 20. The via-holes 31 have the role of a signal line for supplying a power from the outside of the intensity modulation controller 20 to the internal IC of the intensity modulation controller 20.

Moreover, some wiring layers of the wiring layers included in the multilayer printed circuit board 16 are grounded. In the present embodiment, the multilayer printed circuit board 16 includes 14 wiring layers of first to fourteenth wiring layers as counted from the top of the multilayer printed circuit board 16, and five wiring layers (wiring layers 34a to 34e described later) of them are grounded.

Figure 4:
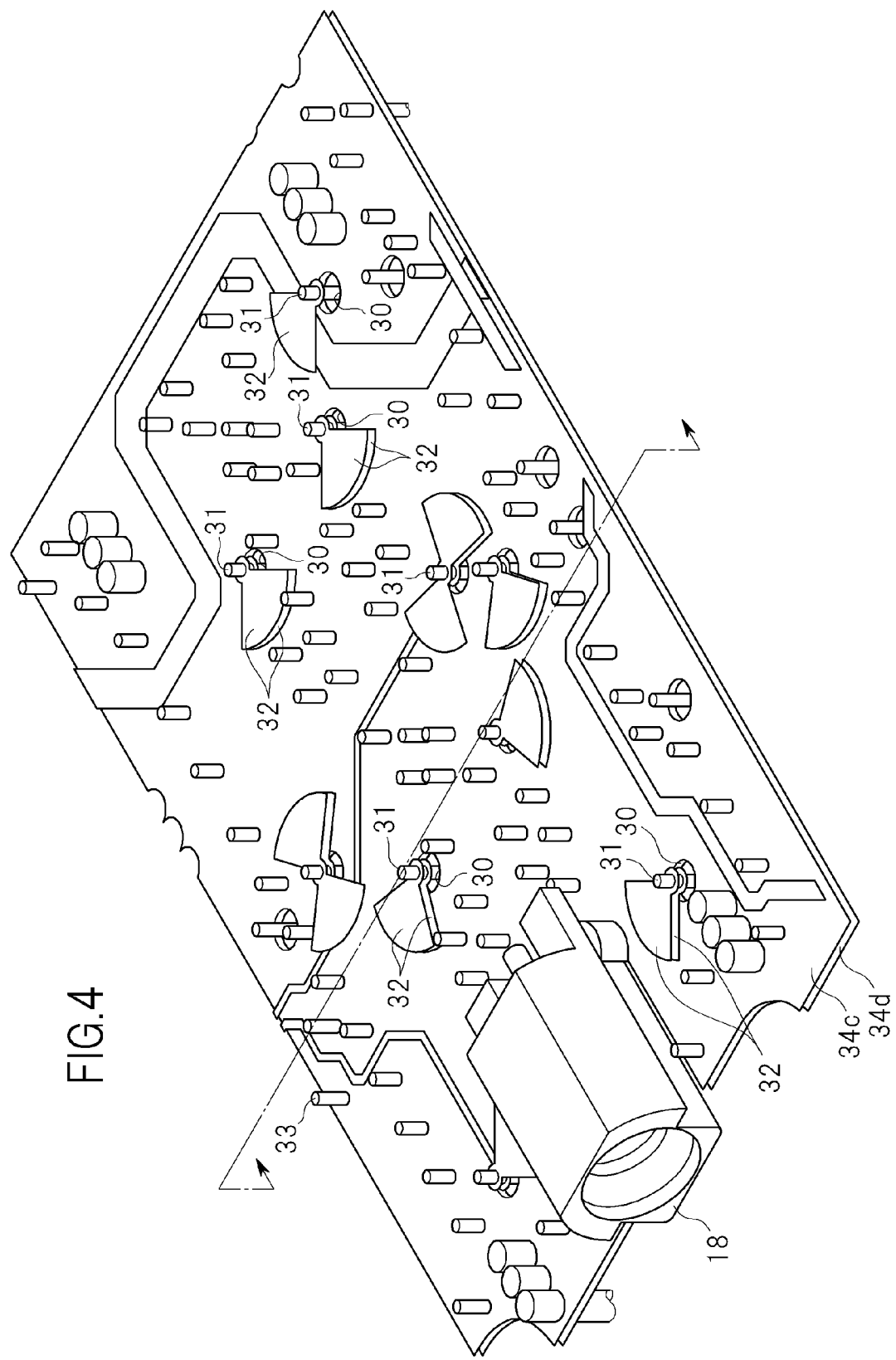
FIG. 4 shows the structure of a multilayer printed circuit board.

FIG. 4 shows the structure of the multilayer printed circuit board 16. A wiring layer 34c is a seventh wiring layer, and a wiring layer 34d is a ninth wiring layer. As shown in FIG. 4, the two wiring layers are connected to a via-hole for ground connection (for example, a ground-via 33) called a ground-via and are grounded by this ground-via. Moreover, although not shown in the figure, wiring layers 34a, 34b, and 34e which are third, fifth, and eleventh wiring layers, respectively, are grounded by a ground-via.

As shown in FIG. 4, openings 30 called anti-pads are formed at the corresponding positions of the wiring layers 34c and 34d. Similarly, the openings 30 are also formed at the corresponding positions of the wiring layers 34a, 34b, and 34e. Here, the copper foil patterns of the wiring layers 34a to 34e are designed so that the via-holes 31 are formed at the inner side of the openings 30. In the present embodiment, the copper foil patterns are designed so that the radius of the approximately concentric openings 30 is larger than the radius of the via-holes 31, and the central position of the openings is identical to the position of the central axis of the via-holes 31. Therefore, the via-holes 31 are separated from the wiring layers 34a to 34e by the openings 30 and are electrically insulated from these wiring layers. Thus, the via-holes 31 are not grounded.

As shown in FIG. 4, open stubs 32 extended from the via-holes 31 are connected to the via-holes 31. In the present embodiment, at least one of an open stub 32 formed by the copper foil pattern of the fourth wiring layer and an open stub 32 formed by the copper foil pattern of the sixth wiring layer is connected to the respective via-holes 31. In the present embodiment, as shown in FIG. 4, the fan-shaped open stub 32 is used.

The importance of the open stub 32 will be described later.

Figure 5:
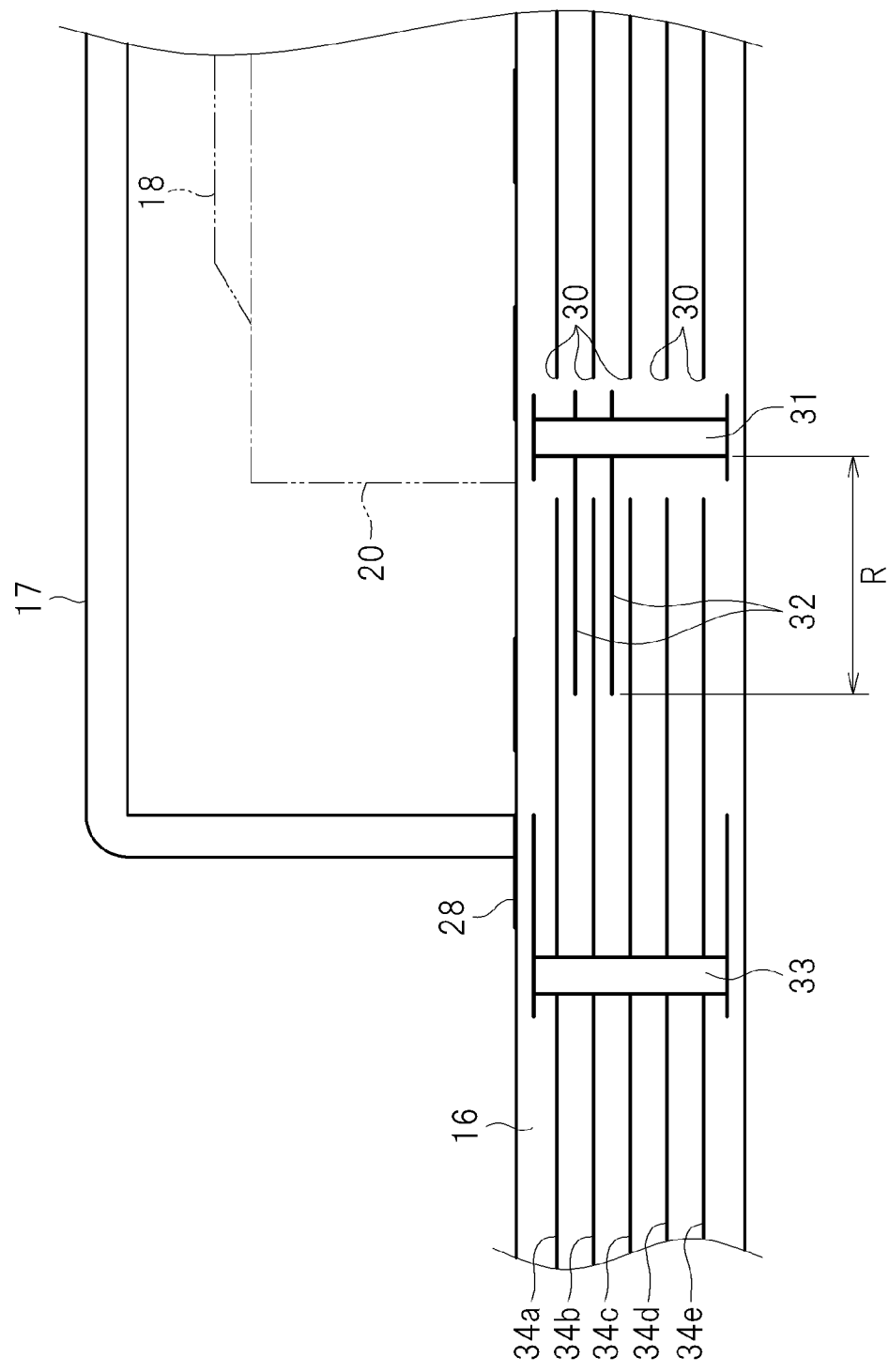
FIG. 5 shows a sectional view of the intensity modulation controller.

FIG. 5 schematically shows the sectional view of the intensity modulation controller 14 taken along the one-dot chain line in FIG. 4. The upper open stub 32 is an open stub that is formed by the copper foil pattern of the fourth wiring layer, and the lower open stub 32 is an open stub that is formed by the copper foil pattern of the sixth wiring layer. As can be understood from FIG. 5, the upper open stub 32 is provided on a wiring layer (that is, the fourth wiring layer) between the wiring layer 34a (first ground conductor layer) which is the third wiring layer and the wiring layer 34b (second ground conductor layer) which is the fifth wiring layer. Moreover, the lower open stub 32 is provided on a wiring layer (that is, the sixth wiring layer) between the wiring layer 34b (first ground conductor layer) which is the fifth wiring layer and the wiring layer 34c (second ground conductor layer) which is the seventh wiring layer. As described above, the two open stubs 32 are separated from the grounded wiring layers 34a to 34e by the openings 30.

In this example, the radius of the via-holes 31 is 0.15 mm. Moreover, the distance between the wiring layer 34a and the upper open stub 32, the distance between the upper open stub 32 and the wiring layer 34b, the distance between the wiring layer 34b and the lower open stub 32, and the distance between the lower open stub 32 and the wiring layer 34c are 0.1 mm. Moreover, a material having a relative permittivity of 3.96 is used as the dielectric substance. Moreover, the length R (see FIG. 5) of the open stubs 32 is 1.75 mm.

[Prevention of Electromagnetic Interference]

According to an investigation of the present inventor, when the clock frequency is as high as 21.5 GHz, since a large amount of electromagnetic waves are radiated from the connection portion of the micro-strip line 26a and the coaxial connector 18, it is necessary to suppress radiation of electromagnetic waves from the intensity modulation controller 14 in order to prevent occurrence of electromagnetic interference (so-called EMI).

In this regard, in the optical transceiver 2, since the intensity modulation controller 14 is covered by the metal casing 17, upward radiation of the electromagnetic waves propagating through the air is suppressed. Moreover, since the multilayer printed circuit board 16 includes grounded wiring layers (that is, the wiring layers 34a to 34e), downward radiation of the electromagnetic waves propagating through the dielectric substance is suppressed.

Therefore, it can be considered that radiation of the electromagnetic waves from the intensity modulation controller 14 is sufficiently suppressed due to the presence of the metal casing 17 and the wiring layers 34a to 34e.

However, even when the metal casing 17 and the wiring layers 34a to 34e are provided, the electromagnetic waves can radiate downwardly from the openings 30 of the wiring layers 34a to 34e and the electromagnetic waves can propagate through the via-holes 31 and radiate downwardly. Therefore, even under the presence of the metal casing 17 and the wiring layers 34a to 34e, there is a possibility that radiation of the electromagnetic waves from the intensity modulation controller 14 is not suppressed as expected.

[Importance of Open Stub]

In this regard, in the optical transceiver 2, since the open stub 32 is provided on the wiring layer between the wiring layer 34a and the wiring layer 34b (see FIG. 5), a band-stop filter that attenuates electromagnetic waves having "a wavelength corresponding to 4/n (n is an odd number) of the length R of the open stub 32" is formed by the open stub 32, the wiring layer 34a, and the wiring layer 34b. Therefore, electromagnetic waves having "a wavelength corresponding to 4/n (n is an odd number) of the length R of the open stub 32" are suppressed from radiating downwardly from the opening 30 of the wiring layer 34b and electromagnetic waves having "a wavelength corresponding to 4/n (n is an odd number) of the length R of the open stub 32" are suppressed from radiating downwardly through the via-hole 31. In addition, since the open stub 32 is also provided on the wiring layer between the wiring layer 34b and the wiring layer 34c (see FIG. 5), the same band-stop filter is also formed by the open stub 32, the wiring layer 34b, and the wiring layer 34c. Therefore, electromagnetic waves having "a wavelength corresponding to 4/n (n is an odd number) of the length R of the open stub 32" are suppressed from radiating downwardly from the opening 30 of the wiring layer 34c and electromagnetic waves having "a wavelength corresponding to 4/n (n is an odd number) of the length R of the open stub 32" are suppressed from radiating downwardly through the via-hole 31.

As a result, radiation of the electromagnetic waves from the intensity modulation controller 14 is suppressed further.

Particularly, in the optical transceiver 2, the length R of the open stub 32 has a value corresponding to the clock frequency (21.5 GHz). That is, the length R of the open stub 32 has a value corresponding to n/4 (n is an odd number) of "the wavelength λ (λ is about 7 mm) of electromagnetic waves having a clock frequency which is calculated based on the relative permittivity (3.96) of the dielectric substance, the clock frequency, the speed of light in vacuum, and the like." More specifically, the length R of the open stub 32 is 1.75 mm which is the length corresponding to ¼ of λ. Therefore, the central frequency of "the band-stop filter which is formed by the wiring layer 34a, the wiring layer 34b, and the open stub 32 (see FIG. 5) provided in the wiring layer between the wiring layer 34a and the wiring layer 34b" is substantially identical to the clock frequency. Moreover, the central frequency of "the band-stop filter which is formed by the wiring layer 34b, the wiring layer 34c, and the open stub 32 (see FIG. 5) provided in the wiring layer between the wiring layer 34b and the wiring layer 34c" is substantially identical to the clock frequency.

Therefore, electromagnetic waves having the clock frequency are suppressed from radiating downwardly from the openings 30 of the wiring layer 34b and the wiring layer 34c, and electromagnetic waves having the clock frequency are suppressed from radiating downwardly through the via-holes 31. As a result, radiation of electromagnetic waves from the intensity modulation controller 14 is suppressed effectively. When the length R of the open stub 32 has a value corresponding to ¼ of λ, and the clock frequency is 21.5 GHz, since the length R is about 1.75 mm, it is suitable for achieving a size-reduction of the intensity modulation controller 14.

Figure 6:
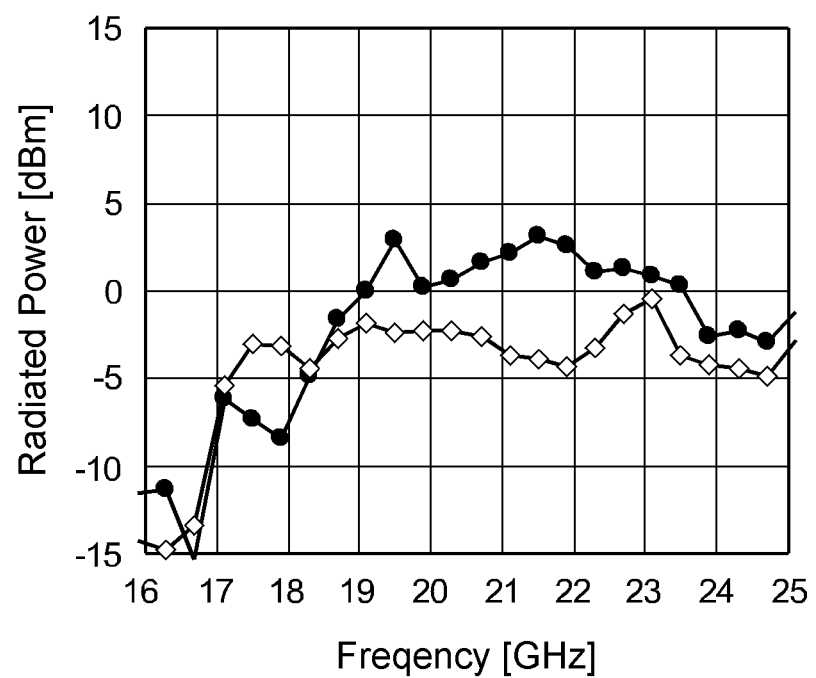
FIG. 6 is a line graph showing the calculation results of radiation power.

The present inventor has conducted electromagnetic analysis and calculated actual power radiated from the intensity modulation controller 14 when the open stubs 32 are provided and also calculated actual power radiated from the intensity modulation controller 14 when no open stub 32 is provided. FIG. 6 is a line graph showing the calculation results of the radiation power. Broken lines made up of diamond-shaped points show the calculation results when the open stubs 32 are provided, and broken lines made up of circular points show the calculation results when no open stub is provided. The horizontal axis represents the clock frequency, and the vertical axis represents the power radiated from the intensity modulation controller 14.

As can be understood from FIG. 6, the power radiated from the intensity modulation controller 14 when the open stubs 32 are provided is decreased as compared to the case where no open stub 32 is provided. Particularly, when the clock frequency is 21.5 GHz, the power radiated from the intensity modulation controller 14 is decreased to 7.0 dB.

Hereinabove, the optical module according to the embodiment of the present invention has been described.

The embodiment of the present invention is not limited to the embodiment described above.

For example, although FIG. 5 shows an example where two open stubs 32 are connected to the via-hole 31, any number of open stubs 32 may be connected to the via-hole 31 as long as the open stub 32 is provided on the wiring layer between two grounded wiring layers (for example, the wiring layers 34a to 34e). For example, one open stub 32 may be connected to the via-hole 31, and three open stubs 32 may be connected to the via-hole 31.

FIG. 7 shows the sectional view of the intensity modulation controller 14 when one open stub 32 is connected to the via-hole 31. As shown in FIG. 7, only the open stub 32 provided on the wiring layer between the wiring layer 34a and the wiring layer 34b is connected to the via-hole 31. Moreover, FIG. 8 shows the sectional view of the intensity modulation controller 14 when three open stubs 32 are connected to the via-hole 31. As shown in FIG. 8, the open stub 32 provided on the wiring layer between the wiring layer 34a and the wiring layer 34b, the open stub 32 provided on the wiring layer between the wiring layer 34b and the wiring layer 34c, and the open stub 32 provided on the wiring layer between the wiring layer 34c and the wiring layer 34d are connected to the via-hole 31.

The present inventor has also conducted electromagnetic analysis and calculated power radiated from the opening 30 on the lowest layer while changing the number of open stubs 32 connected to the via-hole 31. FIG. 9 is a line graph showing the calculation results of the radiation power. The horizontal axis represents the number of open stubs 32 connected to the via-hole 31, and the vertical axis represents the radiation power. It can be understood from the results of electromagnetic analysis that as the number of open stubs 32 increases, the radiation power decreases (see FIG. 9).

Moreover, for example, the respective numbers of open stubs 32 provided to the respective via-holes 31 may be different.

Moreover, for example, the open stub 32 may have an arbitrary shape. For example, the open stub 32 may have a shape obtained by combining two fan shapes and may have a semicircular shape and a rectangular shape.

Moreover, for example, an electromagnetic absorbing member may be disposed between the metal casing 17 and the intensity modulation control IC 20 and the amplifier IC 22.

Moreover, for example, the optical transceiver 2 may be an optical transceiver using an RZ-DQPSK method operating at a plurality of bit-rates (for example, two bit-rates of 43 Gbps and 44.6 Gbps).

Moreover, in the above-described embodiment, although the optical transceiver 2 is the "optical module," another module including the above-described intensity modulation controller may be the "optical module." For example, the above-described transmission module may be the "optical module." Moreover, an optical transmission device including the intensity modulation controller 14 may be the "optical module".

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
   a multilayer printed circuit board which includes a plurality of ground conductor layers and in which a via-hole is formed so as to be insulated from a first ground conductor layer and a second ground conductor layer among the plurality of ground conductor layers by an anti-pad; and
   an amplification circuit that generates an output signal for controlling optical modulation by an optical modulator and outputs the output signal to the optical modulator,
   wherein an open stub is connected in the midway of the via-hole,
   wherein the open stub is provided on a layer between the first ground conductor layer and the second ground conductor layer, and wherein the length of the open stub has a value corresponding to n/4 (n is an odd number) of a wavelength which is determined based on a frequency having the maximum intensity of the frequency components of the output signal.

2. An optical module comprising:

a multilayer printed circuit board which includes a plurality of ground conductor layers and in which a via-hole is formed so as to be insulated from a first ground conductor layer and a second ground conductor layer among the plurality of ground conductor layers by an anti-pad;

a coaxial connector that is provided on the multilayer printed circuit board;

a modulation control circuit that generates a high-frequency clock signal for controlling optical modulation by an optical modulator and outputs the high-frequency clock signal to the coaxial connector;

a signal line which is formed on the multilayer printed circuit board and which is connected to the coaxial connector and the modulation control circuit provided on the multilayer printed circuit board; and a metal casing which is provided so as to cover an upper portion of the modulation control circuit, wherein an open stub is provided in the midway of the via-hole, wherein the open stub is provided on a layer between the first ground conductor layer and the second ground conductor layer, and wherein the open stub is disposed in a lower region of the metal casing.

3. The optical module according to claim 2, wherein the open stub has a length that corresponds to the frequency of the high-frequency clock signal.

4. The optical module according to claim 3, wherein the length of the open stub has a value corresponding to n/4 (n is an odd number) of the wavelength corresponding to the high-frequency clock signal which is determined based on the frequency.

\* \* \* \* \*